United States Patent Office 2,933,485
Patented Apr. 19, 1960

2,933,485

POLYETHYLENE PROCESS

Gaetano F. D'Alelio, South Bend, Ind., assignor, by mesne assignments, to W. R. Grace & Co., New York, N.Y., a corporation of Connecticut No Drawing. Application October 30, 1957
Serial No. 693,234

15 Claims. (Cl. 260—94.9)

This invention relates to a novel synthesis of ethylene polymers.

More particularly, the invention involves making polyethylenes varying from oils to solids by subjecting ethylene in an inert solvent to the action of a catalyst prepared by bringing a member of the group consisting of cobalt and nickel as wire, turnings, powder, or the like into reactive contact with $TiCl_4$, whether or not in the presence of ethylene.

Various methods can be utilized in bringing together Co or Ni with $TiCl_4$ under conditions of reactive contact to prepare the catalyst of this invention. A preferred method includes triturating or grinding particles of a member of the group consisting of Co and Ni in an inert atmosphere in the presence of $TiCl_4$. The catalyst so prepared has been found to be extremely active. When preparing, handling, and using the catalyst, it is considered essential to exclude contaminants or inhibitors such as moisture, oxygen, acetylene, acetone, carbon dioxide, hydrogen sulfide or the like.

Any grinding (milling) at all of $TiCl_4$ plus Ni or Co under inert conditions will provide a catalyst with some activity. However, the preferred procedure is to grind the material thoroughly for at least several hours, e.g., 5 to 300 hours, or even longer. Ball milling overnight is suitable and even longer periods are operable. Substantially any mechanism that causes the individual pieces of Co or Ni to break up into smaller pieces and/or causes their surfaces to be cleaned or abraded so as to provide fresh reactive contact with the $TiCl_4$ can be used, e.g., mortar and pestle, ball mill, rod mill, pebble mill, jet (or colloid) mill, and the like.

When preparing the catalyst by grinding, it is essential that the Ni or Co metal be ground in the substantial absence of oxygen, moisture, and similar contaminants, e.g., CO, acetylene, $NH_3$, and ethers, ketones, and other oxygen-containing organic materials. (Olefins and saturated and aromatic hydrocarbons, however, are not contaminants. They are, in fact, suitable grinding media.) I have found that "lamp-grade nitrogen," e.g., nitrogen of a purity suitable for filling light bulbs, is suitable. Also suitable are the pure noble gases, especially helium, neon, and argon. The same precautions against contaminants applicable in milling also apply to handling, storing, and using the milling material.

Another preferred method of bringing Co or Ni into reactive contact with $TiCl_4$ includes heating Co or Ni with $TiCl_4$ at substantially any temperature above room temperature but preferably between about 125° C. and the melting points of the metals (viz., Co 1480° C. and Ni 1455° C.). Other methods of preparing the catalyst of this invention are possible as will be shown in the examples to follow.

It has been found that the nature of the catalyst largely determines the nature of the polyethylene polymer, i.e., whether the product contains any substantial amount of solid polymer. As a general rule, if any material amount of $TiCl_4$ is present in the reaction mixture along with the $TiCl_4$-treated group member metal, the polymers resulting are oils of varying degrees of viscosity, and little or no solid polyethylene separates from the oil. Accordingly the nature of the polymer product will be determined largely by the presence or absence of $TiCl_4$ in, or adherent to, the metal catalyst, or in the reaction mixture.

The following examples illustrate but do not limit the invention.

EXAMPLE 1

An electrically-heated vertical furnace made of a quartz tube 10 inches long and ¾ inch I.D., wrapped with electrical resistance wire was filled with fine Ni powder (about 20 g.) and gradually heated to 315° C. It was maintained at this temperature for 18 hours while passing a vapor mixture of $TiCl_4$ in $N_2$ through the Ni powder. The metal was allowed to cool gradually to room temperature in a stream of nitrogen, thereby removing any unreacted $TiCl_4$. The Ni metal after this treatment was discolored.

In this example, the $TiCl_4$-$N_2$ vapor mixture was provided by bubbling dry $N_2$ through a flask of $TiCl_4$ at room temperature. The resultant mixture contained about 0.15 vol. percent of $TiCl_4$, and was passed into the furnace at the rate of about 10.8 cc. per minute. This is equivalent to substantially 1 mole $TiCl_4$ per 500 moles Ni, based on $TiCl_4$.

EXAMPLE 2

Twenty grams of Ni catalyst prepared by the procedure of Example 1 was placed in a 200 ml.-capacity stainless steel rocking autoclave containing 50 ml. heptane. Ethylene was forced into the autoclave at a pressure of 210 p.s.i.g., after which the autoclave was sealed, heated to the reaction temperature of 75° C., and maintained at this temperature for 36 hours under the autogenous pressure. At the end of the reaction the autoclave was cooled, vented, and the reaction mixture transferred to a beaker containing 200 ml. of methanol (acidified with a little HCl to dissolve metallic impurities) and boiled for 2 hours. A purified solid polyethylene of high molecular weight was recovered.

EXAMPLE 3

Ten grams comminuted Co and 10 ml. $TiCl_4$ were placed in a 200 ml. stainless steel autoclave containing 100 ml. toluene which was then sealed and heated for 2 hours at 200° C. under the autogenous pressure. So that the catalyst would be suitable for the preparation of liquid polyethylene, the unreacted $TiCl_4$ was not removed.

EXAMPLE 4

The autoclave containing the catalyst as prepared in the preceding example was allowed to cool (from 200° C.) to 175° C., after which ethylene was pumped in under 200 p.s.i.g., and then the autoclave was sealed and heated under the autogenous pressure for 24 hours. A polyethylene oil was obtained.

EXAMPLE 5

Co was crushed to provide finely divided material of a particle size such that most of it passed through a 20-mesh screen but was retained on a 30-mesh screen; it contained, however, 1–2% of minus 100-mesh material. One part by weight of this material was placed in a vessel equipped with reflux condenser and containing about 10 parts by weight of $TiCl_4$. The mixture was boiled under reflux for two hours while passing nitrogen through the vessel so as to prevent pick-up of moisture from the atmosphere. The resultant mixture contains activated Co metal catalyst, which can be recovered and used as such, or, if desired, the entire mixture can be used, including unreacted TiCl₄, with results as herein described.

EXAMPLE 6

A catalyst was prepared by passing TiCl₄ vapor for 6 hours through a glass tube packed with finely divided Ni maintained at a temperature of 125–140° C. The resultant material was allowed to cool under a stream of nitrogen, and was stored under slight nitrogen pressure.

EXAMPLE 7

A length of Co wire (99.9+Co), 1/20 inch in diameter, was suspended as a spiral of several coils in a 500 ml. 3 neck flask equipped with reflux condenser, nitrogen inlet, and sealed outlet for the two ends of the wire. The flask contained 125 ml. TiCl₄. The wire was positioned throughout its length so that none of the coils touched each other, so as to avoid electrical short circuits. The coils were completely submerged in the TiCl₄ liquid. The two ends were connected to a source of E.M.F. providing 25 volts delivered at 4 amperes, through a variac so that the wire was heated by resistance. As the wire warmed up, the TiCl₄ began to boil vigorously at the surface of the wire. The variac was adjusted to keep the return of TiCl₄ in the reflux condenser at a low but steady rate, and these conditions were maintained overnight (12–15 hours) under a nitrogen atmosphere. Thereafter the TiCl₄ remaining was decanted, the flask and the treated wire still in position were washed with toluene, dried with warm nitrogen, and stored under a slight nitrogen pressure for use as a polyethylene catalyst by the process of this invention.

EXAMPLE 8

Substantialy the same materials and procedure were used as in Example 7, except that (a) only 15 ml. of TiCl₄ was used, (b) the wire was positioned so that none of it was immersed in the TiCl₄, nor exposed to liquid return from the reflux condenser, (c) the flask was heated externally to maintain the TiCl₄ boiling at a low rate, (d) the Co wire was heated to dull redness in the resultant TiCl₄ vapor for about 10 minutes, and (e) the TiCl₄ was thereafter removed by boiling it out of the flask along with a stream of nitrogen.

The following examples illustrate methods of polymerization using catalyst prepared by grinding Co or Ni with TiCl₄ in an inert atmosphere.

EXAMPLE 9

Two ml. of titanium tetrachloride and 20 grams of granulated cobalt were ball milled in an inert atmosphere (N₂) for 13 days in a conventional stainless steel ball mill of 4 ounce capacity, containing about half its bulk volume of ½ inch stainless steel balls. At the end of this time the thus prepared catalyst was flushed from the ball mill with 50 ml. of toluene into a 200 ml. stainless steel rocking autoclave. This transfer is best carried out under inert conditions such as in a nitrogen dry box, owing to the fact that the catalyst is extremely pyrophoric and is sensitive to contaminants such as moisture, oxygen and the like. The autoclave was sealed, pressured to 700 p.s.i. with ethylene, and heated to 130° C. for about 12 hours. At the end of this time the autoclave was cooled, vented and opened. The product was removed and purified with boiling methanolic hydrogen chloride by the well-known procedure. The yield of high density polyethylene was 7.8 grams.

EXAMPLE 10

Two ml. of titanium tetrachloride and 5 grams of nickel powder were ball-milled together for 4 days in a conventional stainless steel ball mill of 4 ounce capacity, containing therein about half its bulk volume of ½ inch stainless steel balls. At the end of this time the ball mill was opened in a nitrogen dry box and 50 ml. hexane added to the material after which it was resealed and returned to the rollers for 23 additional days of ball-milling. At the end of this time the hexane slurry of catalyst was transferred to a 200 cc. stainless steel rocking autoclave, which was sealed, pressured to 500 p.s.i. with ethylene, and heated to 125° C. for about 12 hours. At the end of this time the product was recovered as in the preceding example to provide 20 grams of purified high density polyethylene.

General remarks

In forming the catalyst, it is considered essential to discontinue the reaction of TiCl₄ with Co or Ni before the Co or Ni metal is completely consumed, so that the material formed will consist essentially of Co or Ni together with the reaction product of Co or Ni with TiCl₄, as the case may be. The nature of this reaction product has not been definitely established, and in fact it appears to vary in composition depending on the conditions of reaction. Thus, the composition of such reaction product formed when Co or Ni is boiled in TiCl₄ (at 136° C.) appears to be different from the composition of the product formed when Co or Ni is heated at 200–500° C. with TiCl₄ or when the catalyst is prepared by grinding Co or Ni in TiCl₄ in an inert atmosphere. In each case, however, it appears that some amount of a lower chloride of Ti is formed, i.e., TiCl₂ and/or TiCl₃, so that my experimental data are consistent with the theory that the catalyst comprises at least the group member i.e. Co or Ni plus TiCl₂ and/or TiCl₃. However, I do not wish to be bound by any theory of operation; it suffices to say that when Co or Ni is treated with TiCl₄ in the manner herein described, a highly active catalyst is formed that is capable of polymerizing ethylene.

If it is desired to prepare the catalyst for use in making solid polyethylene with little or no liquid polyethylene, hydrocarbon-soluble chlorides (mostly as unreacted TiCl₄) should be removed from the activated Co or Ni metal mass. A suitable procedure for removing hydrocarbon-soluble chlorides from the catalyst mass comprises one or more initial washes with a hydrocarbon known to form complexes with TiCl₄, e.g., benzene or toluene, followed by one or more washes with a non-complexing hydrocarbon, e.g., heptane, to remove any residual TiCl₄-benzene or TiCl₄-toluene complex. However, this particular means of chloride removal is by no means critical, since several washes with non-complexing hydrocarbons will accomplish the same result. Also, the hydrocarbon-soluble chlorides may be removed by other means obvious to one skilled in the art, e.g., by heating the catalyst mass and vaporizing or subliming such chlorides from the catalyst in a stream of inert gas, such as nitrogen, argon, or the like (as was done in Example 1).

In the ethylene polymerization step, the reaction temperature is suitably 20 to 200–250° C., and the reaction pressure can range from fairly low pressures to fairly high pressures, i.e., from atmospheric pressure, e.g., 15 p.s.i., up to 10,000 p.s.i. and even higher. Obviously when it is desired to use a temperature higher than that of the boiling point of the inert solvent selected, the reaction must be carried out under super-atmospheric pressure. Ordinarily, pressures of the order of atmospheric to 500–1000 p.s.i. will give a good yield of product.

As a polymerization menstruum, substantially any inert material can be used which is liquid under the conditions of temperature and pressure employed and which has a solvent action on ethylene. These solvents are well-known to those skilled in the art. Hydrocarbon solvents are preferred, and are preferably substantially free of materials that react with lower chlorides of titanium, e.g., water, CO₂, O₂, and the like. Suitable solvents include pentane, hexane, heptane, cyclohexane, octane, benzene, xylene, toluene and the like. The aromatic hydrocarbons are the preferred solvents.

The amount of catalyst is not critical. Relatively small amounts are operable to form relatively large amounts of polyethylene. In general, a practical range is a weight ratio of 0.001–0.1 gram activated Co or Ni per gram of ethylene polymerized. Even larger amounts of catalyst are operable, but present a purification problem as well as an economic problem.

The uses of the polyethylenes of this invention are analogous to the uses of these prepared by prior art procedures. The solid polyethylenes of this invention can be used to make moldings, film, filament, pipe, tubing, extruded articles, and the like, using the same equipment and techniques customary for solid polyethylenes of the prior art. The liquid polymers prepared by the process of this invention are useful as chemical intermediates for alkylation, epoxidation, and the like, by procedures well known to those skilled in the art, and as plasticizers for the solid polymers produced by the procedures herein described, e.g., 1 part of the oil produced in Example 4 can be thoroughly mixed with 10 parts of the solid polymer produced in Example 2 to give a product that is readily extruded into sheet in conventional sheet-extrusion apparatus.

I claim:

1. The method of polymerizing ethylene that includes the step of contacting ethylene in an inert hydrocarbon solvent with a catalyst consisting essentially of a reaction product of $TiCl_4$ and a metal of the group consisting of cobalt and nickel prepared by reacting $TiCl_4$ with respect to said metal in the ratio of at least 1 mole of $TiCl_4$ per 500 moles of said metal and discontinuing the reaction before all the metal is consumed; and recovering the thus-formed polyethylene.

2. The method according to claim 1 in which the polymerization is carried out under a pressure of at least 15 p.s.i.

3. The method according to claim 2 in which the pressure is 15 to 1000 p.s.i.

4. The method according to claim 1 in which the polymerization temperature is at least 20° C.

5. The method according to claim 4 in which the temperature is 20–200° C.

6. The method according of claim 1 in which the polymerization is conducted in the presence of $TiCl_4$.

7. The method according to claim 1 in which the hydrocarbon soluble chlorides are removed from the catalyst prior to use.

8. The method according to claim 1 in which the weight ratio of catalyst to ethylene polymerized is about 1:10–1000.

9. The method of preparing a catalyst that comprises reacting $TiCl_4$ with a metal of the group consisting of Co and Ni in a $TiCl_4$: metal ratio of at least 1 mole $TiCl_4$ per 500 moles of metal, and discontinuing the reaction before all the metal is consumed.

10. The method according to claim 9 for preparing a catalyst that comprises grinding a member of the group consisting of Co and Ni with $TiCl_4$ under inert conditions.

11. The method according to claim 10 in which the grinding is performed in an atmosphere of an inert vapor.

12. The method according to claim 10 in which the grinding operation is continued for at least 5 hours under a gas of the group consisting of nitrogen and the noble gases.

13. The method according to claim 9 of preparing a catalyst consisting essentially of a reaction product of $TiCl_4$ and a metal of the group consisting of cobalt and nickel that includes the step of heating $TiCl_4$ with respect to said metal in the ratio of at least 1 mole of $TiCl_4$ per 500 moles of said metal and discontinuing the reaction before all the metal is consumed.

14. The method according to claim 13 of preparing a catalyst consisting essentially of a reaction product of $TiCl_4$ and a metal of the group consisting of cobalt and nickel that includes the step of boiling said metal with $TiCl_4$ for about 12–15 hours, the $TiCl_4$ with respect to said metal being in the ratio of at least 1 mole of $TiCl_4$ per 500 moles of said metal, and discontinuing the boiling before all the metal is consumed.

15. The method according to claim 13 of preparing a catalyst consisting essentially of a reaction product of $TiCl_4$ and a metal of the group consisting of cobalt and nickel that includes the step of heating said metal with $TiCl_4$ vapor at 200–500° C., the $TiCl_4$ with respect to said metal being in the ratio of at least 1 mole of $TiCl_4$ per 500 moles of said metal, and discontinuing the heating before all the metal is consumed.

References Cited in the file of this patent

UNITED STATES PATENTS

| 2,781,410 | Ziegler et al. | Feb. 12, 1957 |

FOREIGN PATENTS

| 777,152 | Great Britain | June 19, 1957 |
| 874,215 | Germany | Apr. 20, 1953 |
| 534,792 | Belgium | Jan. 31, 1955 |
| 538,782 | Belgium | Dec. 6, 1955 |